(12) United States Patent
White

(10) Patent No.: US 6,309,162 B1
(45) Date of Patent: Oct. 30, 2001

(54) DATA STORAGE SYSTEM WITH REDUNDANT MEDIA HANDLING ASSEMBLIES

(75) Inventor: Joseph M. White, Windsor, CO (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/311,243

(22) Filed: May 13, 1999

(51) Int. Cl.$^7$ ................................................ B65G 1/137
(52) U.S. Cl. ............................ 414/273; 901/8; 700/228; 360/98.05
(58) Field of Search .................. 414/222.12, 222.13, 414/226.01, 273, 275, 807; 360/98.05; 700/228; 901/8

(56) References Cited

U.S. PATENT DOCUMENTS

| | | | |
|---|---|---|---|
| 4,864,438 | * 9/1989 | Munro | 414/273 X |
| 5,101,387 | 3/1992 | Wanger et al. | 369/36 |
| 5,427,489 | * 6/1995 | Chalmers et al. | 414/273 X |
| 5,429,470 | * 7/1995 | Nicol et al. | 414/273 X |
| 5,431,520 | * 7/1995 | Brugger | 414/807 X |
| 5,455,810 | 10/1995 | Luffel | 369/36 |
| 5,544,146 | 8/1996 | Luffel et al. | 369/178 |
| 5,818,723 | * 10/1998 | Dmitri | 360/99.02 X |
| 6,038,490 | * 3/2000 | Dmitri et al. | 700/214 |
| 6,059,509 | * 5/2000 | Ostwald | 414/807 X |

FOREIGN PATENT DOCUMENTS

| | | | |
|---|---|---|---|
| 19517661 | 11/1996 | (DE) | G11B/33/10 |
| 0351221 | 1/1990 | (EP) . | |
| 124159 | * 9/1981 | (JP) | 414/273 |
| 213948 | * 9/1987 | (JP) | 901/8 |
| 10780 | * 1/1991 | (JP) | 901/8 |
| 11073708 | 3/1999 | (JP) . | |
| 86/06050 | * 10/1986 | (WO) | 414/273 |

OTHER PUBLICATIONS

Sep. 6, 2000, English Language Search Report from Corresponding EPO Application 00 12 2949 indicating degree of relevance found by EPO for DE 19517661.

IBM Technical Disclosure Bulletin, "Moving Rack Automated Library For Removable Data Storage Media", vol. 36 No.09A, Sep. 1993, p. 119–120.

\* cited by examiner

*Primary Examiner*—James W. Keenan

(57) ABSTRACT

A data storage system comprising: a media picker displacement path having a first end and a second end; a first media picker assembly mounted in the picker displacement path; a second media picker assembly mounted in the picker displacement path; a plurality of data storage media access locations located along the picker displacement path; the first media picker assembly being displaceable along the path from the first end to a point of interfering contact with the second media picker assembly; the second media picker assembly being displaceable along the path from the second end to a point of interfering contact with the first media picker assembly; the storage system having a normal running operating mode wherein the first media picker assembly is stationarily positioned at the first end of the displacement path and the second picker assembly is selectively positionable along the remainder of the path; the storage system having a fall back running operating mode wherein the second media picker assembly is stationarily positioned at the second end of the displacement path and the first picker assembly is selectively positionable along the remainder of the path.

3 Claims, 9 Drawing Sheets

DATA STORAGE SYSTEM WITH REDUNDANT MEDIA HANDLING ASSEMBLIES

FIELD OF THE INVENTION

The present invention relates generally to data storage systems for handling and storing data storage media devices such as data cartridges, and more particularly to a data storage system having redundant media handling assemblies.

BACKGROUND OF THE INVENTION

Data storage in the computer industry is accomplished in a number of ways. For example, data may be stored on various data storage media devices such as tapes, compact disks, "floppy" or "hard" disks, and the like. Oftentimes, data storage media which is transferrable from one location to another is housed within a parallelepiped-shaped cartridge. It is to be understood that the term "cartridge" or "data cartridge" as used in the present application encompasses any data storage media device, whether or not it is housed within a cartridge.

Data storage systems are used to store data cartridges at known locations and to retrieve desired cartridges so that data may be written to or read from the cartridges. A typical data storage system may include different types of cartridge receiving devices. For example, one type of cartridge receiving device is a cartridge storage rack or "magazine" which has a plurality of individual cartridge storage locations. Another type of cartridge receiving device is a cartridge read/write device or "drive". A data storage system may also include a cartridge handling assembly for retrieving data cartridges and translating them among cartridge receiving devices (e.g., from a cartridge storage location to a drive and vice-versa).

Data storage systems may be produced in a variety of sizes and configurations. One type of data storage system has a guide track extending along the length of a central vertical shaft. A single data cartridge handling assembly or "picker" assembly is vertically displaceable along the track and is adapted to move data cartridges between cartridge receiving devices positioned adjacent to the central vertical shaft in vertically stacked layers or tiers. In some storage systems of this type all components are provided in a single housing unit. In other storage systems of this type a plurality of modular housing units are stacked one on top of the other to provide a compound housing assembly. In a compound housing assembly each modular housing unit contains a portion of the vertical shaft and one or more of the tiers of cartridge receiving devices of the data storage system. Such an assembly of modular units is disclosed in U.S. patent application Ser. No. 09/137,350 filed Aug. 20, 1998 for MODULAR DATA STORAGE SYSTEM of Joseph M. White, Matthias Lester, and Dave Jones abandoned, which is hereby incorporated for all that it discloses. An advantage of an integral data storage system having multiple vertically stacked tiers accessible by a single picker assembly over systems having multiple independent single tier units, each with its own picker assembly, is that it obviates the need to coordinate the operation of multiple systems. Also, unnecessary duplication of certain system components, such as drives and pickers, is avoided. However one disadvantage of a unitary system having a single picker assembly is that a failure of the picker assembly causes loss of access to all of the media in the storage system until the picker is repaired or replaced. It would be generally desirable to provide a data storage system having multiple vertically stacked tiers accessible by a single picker assembly with a subsystem which would automatically replace a nonoperating picker assembly with an operating picker assembly so that the user's access to data stored in the system is not interrupted.

SUMMARY OF THE INVENTION

The present invention is directed to a data storage system for handling and storing data storage media. The system ordinarily uses a single main media picker assembly to move media between media receiving devices positioned along a picker displacement path. If the main picker assembly fails it is automatically removed from a portion of the path associated with media access and is replaced by a "fall back"/"back up"/"redundant" picker assembly which continues operation of the data storage system without significant interruption.

Thus the invention may comprise a data storage system comprising: a housing assembly having a first end and a second end and having an open shaft extending between said first end and said second end and comprising: a first housing unit having a first portion of said open shaft extending therethrough, said first unit being positioned proximate said first end of said housing assembly; a second housing unit having a second portion of said open shaft extending therethrough, said second unit being positioned proximate said second end of said housing assembly; at least a third housing unit having a third portion of said open shaft extending therethrough having a plurality of data media receiving devices mounted therein, said third housing unit being disposed between said first and second housing units; a first media handling assembly displaceably positioned within said open shaft; and a second media handling assembly displaceably positioned within said open shaft.

The invention may also comprise a data storage system comprising: a media picker displacement path having a first end and a second end; a first media picker assembly mounted in the picker displacement path; a second media picker assembly mounted in the picker displacement path; a plurality of data storage media access locations located along the picker displacement path; the first media picker assembly being displaceable along the path from the first end to a point of interfering contact with the second media picker assembly; the second media picker assembly being displaceable along the path from the second end to a point of interfering contact with the first media picker assembly.

The invention may also comprise a method of operating a data storage library comprising: moving data storage media between media holding positions located along a one-picker-at-a-time picker displacement path with a first media picker assembly until the first media picker assembly malfunctions; after it malfunctions moving the first picker assembly to a first end of the picker displacement path; maintaining a second media picker assembly at a stationary position at a second end portion of the picker displacement path until the first picker assembly malfunctions; after the first picker assembly malfunctions moving data storage media between media holding positions located along the picker displacement path with the second picker assembly.

BRIEF DESCRIPTION OF THE DRAWINGS

Illustrative and presently preferred embodiments of the invention are shown in the accompanying drawings in which.

DETAILED DESCRIPTION OF THE INVENTION

Figure 1:
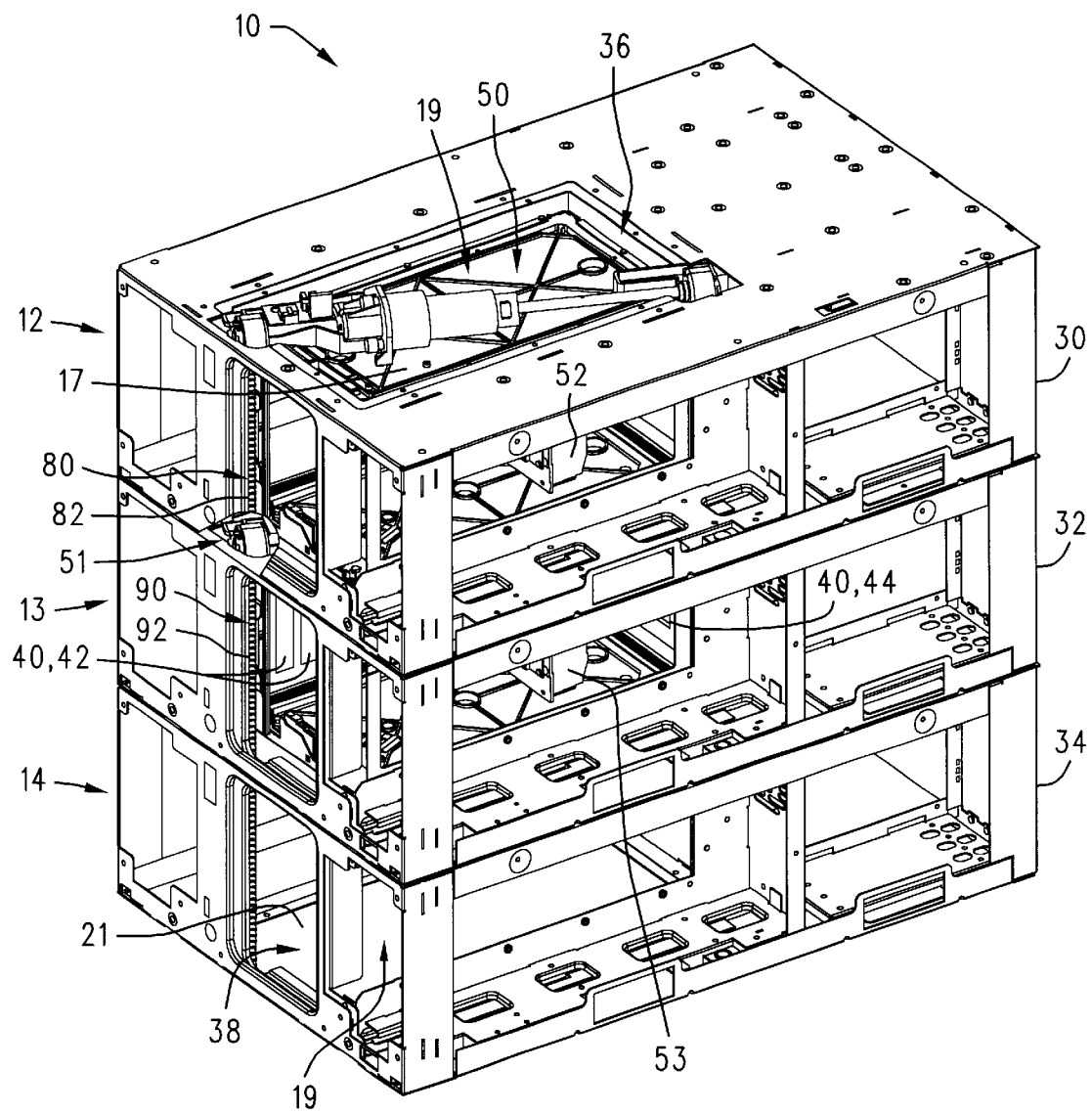
FIG. 1 is an isometric view of a modular data storage system.

The drawing, in general, illustrates a data storage system (10) comprising: a media picker displacement path (19) having a first end (17) and a second end (21); a first media picker assembly (50) mounted in the picker displacement path (19); a second media picker assembly (51) mounted in the picker displacement path (19); a plurality of data storage media access locations (40) located along the picker displacement path (19); the first media picker assembly (50) being displaceable along the path from the first end (17) to a point of interfering contact with the second media picker assembly (51); the second media picker assembly (51) being displaceable along the path (19) from the second end (21) to a point of interfering contact with the first media picker assembly (50).

Having thus generally described a data storage system 10, various embodiments thereof will now be described in detail. One embodiment of a modular data storage system 10 is shown in FIG. 1 and comprises at least three modular units 12, 13, 14. The modular units 12, 13, 14 are stackable vertically upon one another to form a compound housing assembly. While three modular units are shown in FIG. 1, it is to be understood that as few as three, or as many modular units as a customer desires, may be utilized in the modular data storage system 10. Furthermore, one or more modular units may be added to the modular data storage system at any time. The modular data storage system 10 may also comprise cartridge (media) handling assemblies 50, 51 (generally referred to in the art as "picker assemblies" or "pickers") which may be vertically translated along an open shaft 19 extending through the adjacent modular units 12, 13, 14 and having a first end 17 and a second end 19, as described in further detail below.

In one embodiment the modular units 12, 13, 14 are substantially identical to one another, except where noted otherwise below. Each modular unit 12, 13, 14 may comprise a housing 30, 32, 34, each having an upper opening, e.g., 36 and a lower opening, e.g., 38. Each of the openings 36, 38 are sized and shaped to allow the cartridge handling assembly 50 to pass therethrough. Each intermediately positioned modular unit 13, etc., i.e. all modular units except for the top most and bottom most units 12, 14 may further comprise a plurality of cartridge receiving devices 40 which may be, for example, magazines (e.g., 42) or drives (e.g., 44), or any combination thereof. The configuration of cartridge receiving devices 40 within each intermediate modular unit 13 need not be identical; each intermediate modular unit may be configured to suit a customer's particular needs.

As described elsewhere herein the top and bottom modules 12, 14 serve primarily as storage and access bays for the currently inactive picker assembly 50, 51. Thus, the top and bottom modules 12, 14 may be identical to the intermediate module(s) 13, etc. except that no cartridge receiving devices 40 would ordinarily be positioned therein.

Figure 2:
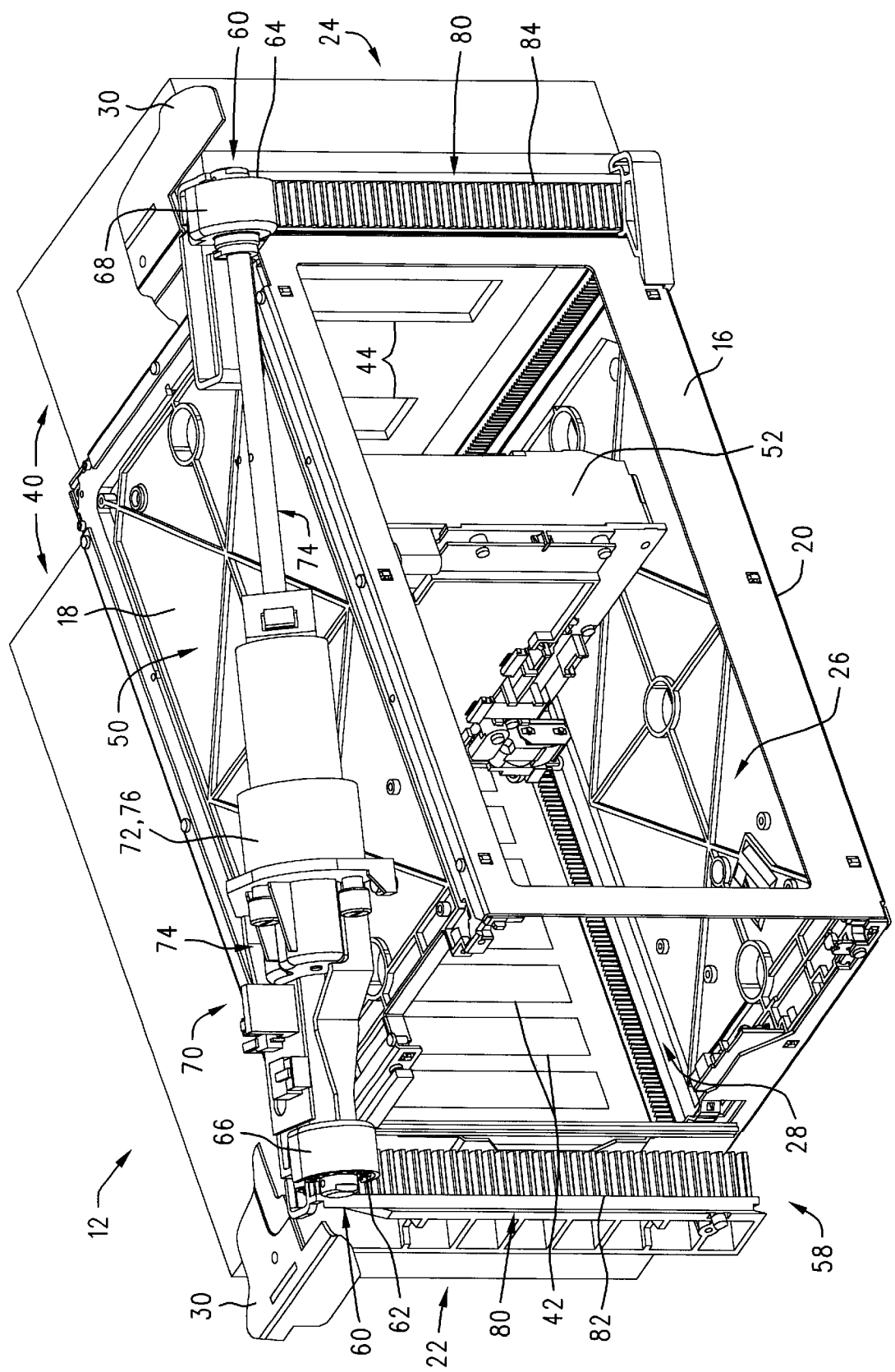
FIG. 2 is an isometric view of a modular unit from the modular data storage system of FIG. 1, with most of the housing broken away.

The cartridge handling assembly 50 may be of the type described in U.S. patent application Ser. No. 09/045,134 filed Mar. 20, 1998 for MULTI-PLANE TRANSLATING CARTRIDGE HANDLING SYSTEM of Gregg Schmidtke and Robert Mueller, now U.S. Pat. No. 6,025,972, issued Feb. 15, 2000, which is hereby incorporated by reference for all that is contained therein. FIG. 2 illustrates a modular unit 12 with most of the housing 30 broken away to more clearly show the cartridge handling assembly 50. It is to be understood that the description below, except for the absence of cartridge receiving devices 40 in units 12 and 14, may apply to all of the modular units (e.g., 12, 13, 14) of the modular data storage system 10.

Figure 11:
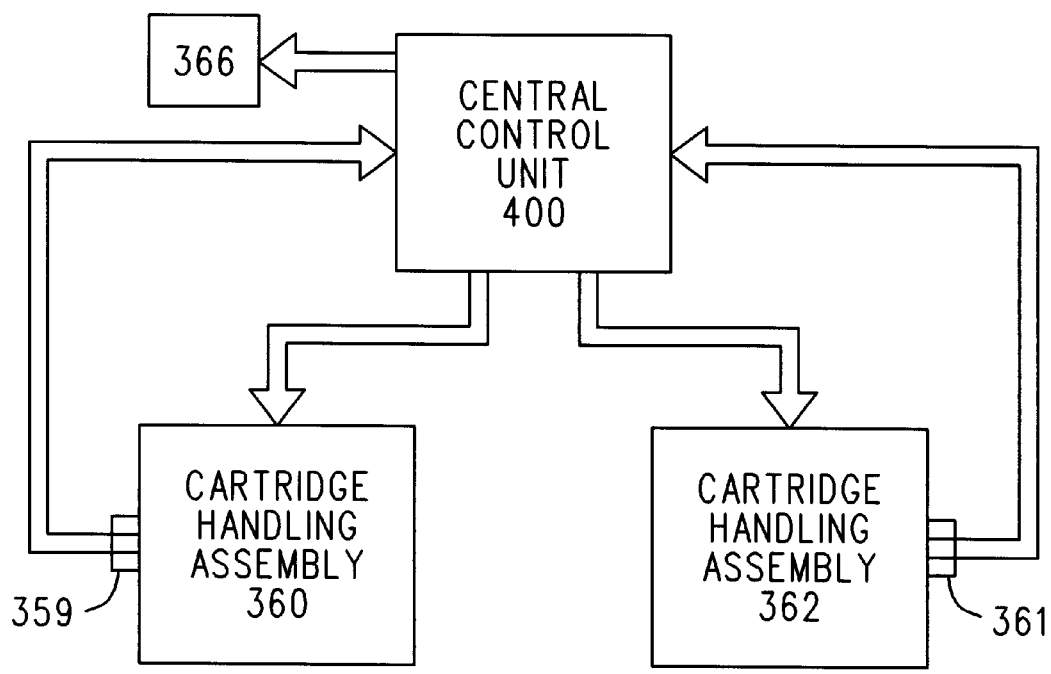
FIG. 11 is a block diagram of a data storage system central control unit and two cartridge handling assemblies.

As shown in FIG. 2, the cartridge handling (picker) assembly 50 may comprise a generally rectangular frame 16 having an upper portion 18, a lower portion 20, and four sides 22, 24, 26, 28. Cartridge receiving devices 40 (magazines 42 and drives 44) are preferably accessible from at least one, and most preferably two or more, of the sides 22, 24, 26, 28. The cartridge handling assembly 50 may also comprise a cartridge access device 52 capable of loading and retrieving the data cartridges (not shown) from the cartridge receiving devices 40. Cartridge handling assembly 51 may be identical to cartridge handling assembly 50. Z-fold ribbon cable (not shown) may be attached at one end to the top of the cartridge handling assembly 50 and extended out the top of the shaft 19 and attached at the other end to a control unit 400, FIG. 11. A second Z-fold cable may be attached to the lower handling assembly 51 and extended out the bottom of shaft 19 to connect it to the control unit.

The modular data storage system 10 may also comprise a vertical lift system 58, which is best shown in FIG. 2. The vertical lift system 58 may comprise a pinion gear assembly 60 mounted on the cartridge handling assembly 50. The vertical lift system 58 may further comprise an actuator system 70 operably attached to the pinion gear assembly 60 for vertically translating the cartridge handling assembly 50 among the adjacent modular units 12, 13, 14 (FIG. 1). The vertical lift system 58 may further comprise a rack assembly (e.g., 80) mounted on each of said modular units (e.g., 12), which is operably associated with the pinion gear assembly 60.

The pinion gear assembly 60 is preferably comprised of a first pinion gear 62 and a second pinion gear 64, mounted diagonally opposite one another as shown in FIG. 2. Each pinion gear 62, 64 is preferably at least partially enclosed within a protective housing 66, 68, respectively. The rack assembly 80 as shown in FIG. 2 is preferably comprised of a first rack 82 and a second rack 84, mounted diagonally opposite one another and in alignment with the pinion gears 62, 64, respectively. Each rack 82, 84 is fixedly attached to the modular unit housing 30. The actuator system 70 is preferably comprised of a motor 72, a gear/shaft assembly 74 to operably attach the motor 72 to the pinion gears 62, 64, and a protective housing 76. The actuator system protective housing 76 may be integrally formed with at least one of the pinion gear protective housings (e.g. 66), as shown in FIG. 2.

Figure 3:
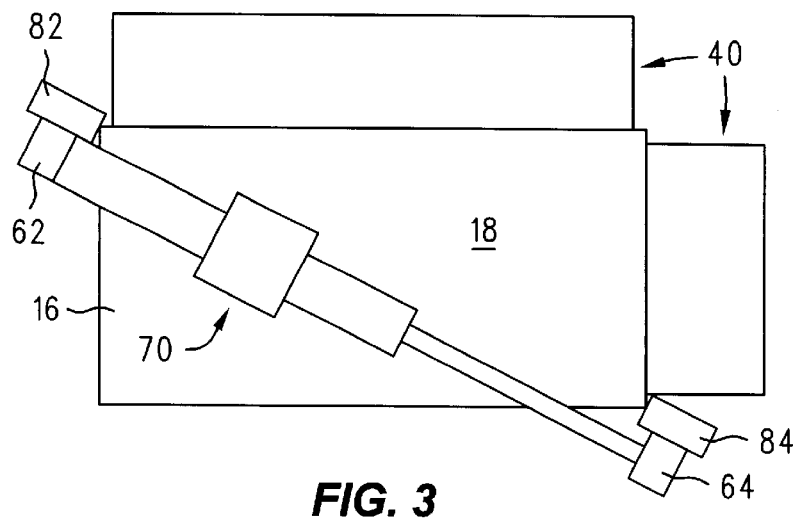
FIG. 3 is a top plan view of the modular unit of FIG. 2 schematically illustrating a preferred mounting position of the actuator system and pinion gear assembly.
Figure 4:
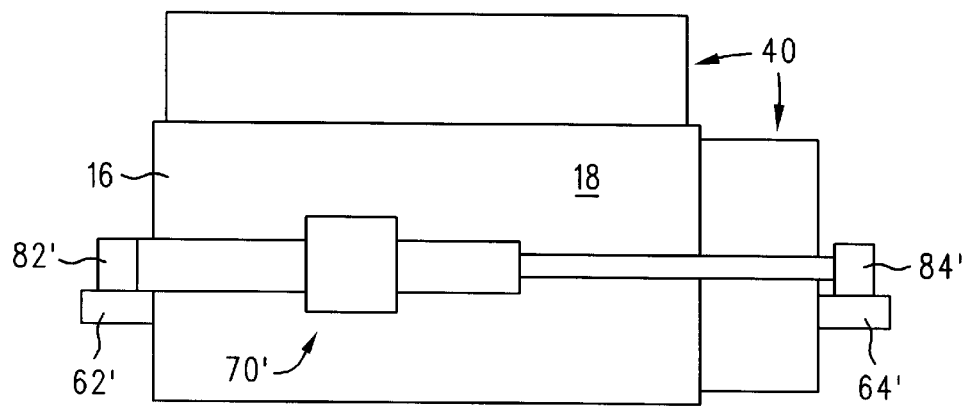
FIG. 4 schematically illustrates an alternative longitudinal mounting position for the actuator system and pinion gear assembly of FIG. 3.
Figure 5:
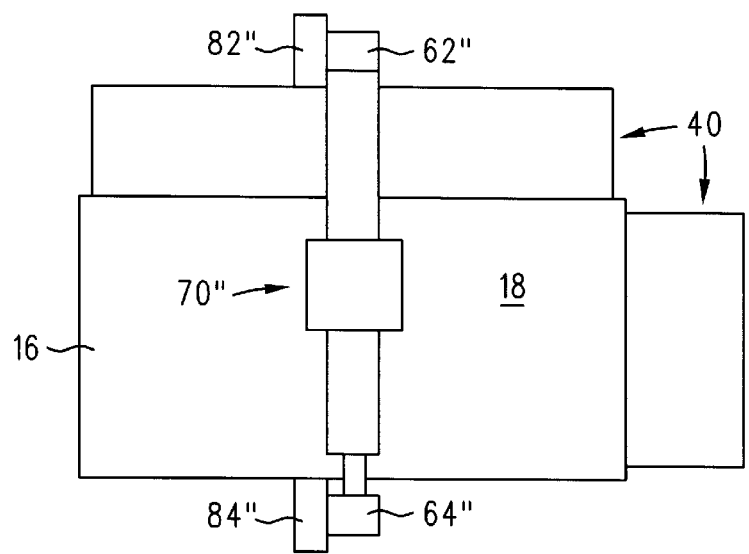
FIG. 5 schematically illustrates an alternative lateral mounting position for the actuator system and pinion gear assembly of FIG. 3.

The actuator system 70 and pinion gears 62, 64 of the pinion gear assembly 60 are preferably fixedly attached to the cartridge handling assembly frame 16 at the upper portion 18 thereof. The actuator system 70 and pinion gears 62, 64 are preferably mounted diagonally as shown in FIGS. 1, 2 and schematically in FIG. 3 in order to most evenly distribute the weight thereof along the upper portion 18 of the frame 16. The racks 82, 84 are also mounted diagonally as shown in this embodiment. FIGS. 4 and 5 illustrate alternate mounting positions for the actuator system, pinion gears and racks. As shown in FIG. 4, the actuator system 70' may be mounted longitudinally, with the pinion gears 62', 64' being mounted longitudinally opposite one another and the racks 82', 84' also being mounted longitudinally opposite one another. As shown in FIG. 5, the actuator system 70" may be mounted laterally, with the pinion gears 62", 64" being mounted laterally opposite one another and the racks 82", 84" also being mounted laterally opposite one another. Furthermore, the actuator system 70 may be mounted diagonally, longitudinally or laterally as shown in FIGS. 3–5 at either the upper portion 18 or the lower portion 20 (FIG. 2) of the frame 16.

Figure 6:
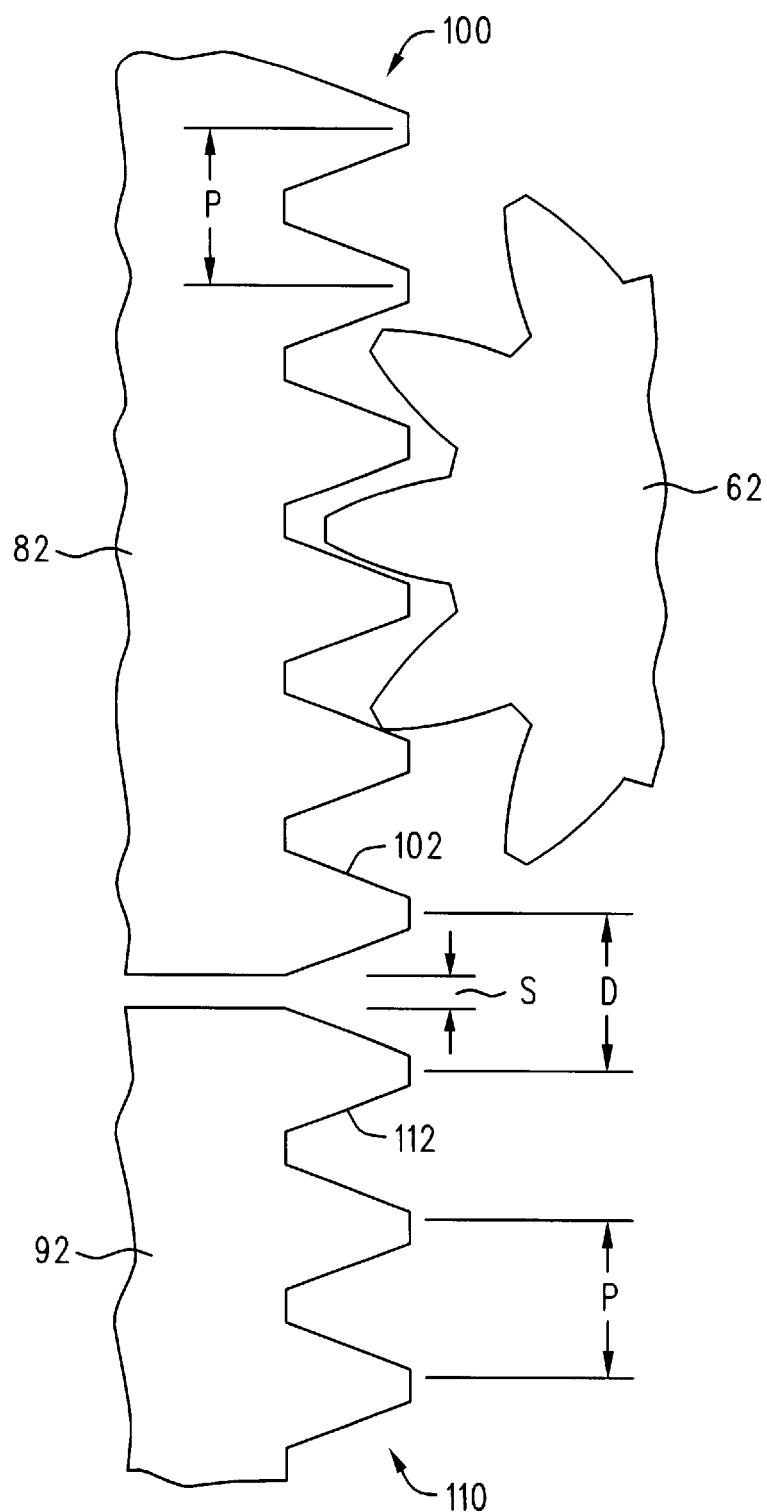
FIG. 6 is an enlarged side elevational view schematically illustrating an upper rack and a lower rack from two adjacent modular units and a pinion gear of the modular data storage system of FIG. 1.

Referring again to FIG. 1, among adjacent modular units 12, 13, 14 there is an upper modular unit (e.g., 12) and a lower modular unit (e.g. 13). The upper modular unit 12 comprises an upper rack assembly 80, and the lower modular unit comprises a lower rack assembly 90. FIG. 6 illustrates an upper rack 82 and a lower rack 92 from two adjacent modular units 12, 13, respectively, and a pinion gear 62. It is to be understood that the following description also applies to the second rack (e.g., 84) of each rack assembly 80, 90 and also to the second pinion gear 64 of the pinion gear assembly 60.

As shown in FIG. 6, the upper rack 82 comprises a plurality of gear teeth 100 having a predetermined pitch "P" (measured centerline-to-centerline), and the lower rack 92 also comprises a plurality of gear teeth 110 having the same predetermined pitch "P". The upper rack 82 comprises a lowermost gear tooth 102, and the lower rack 92 comprises an uppermost gear tooth 112. In order for the pinion gear 62 to translate smoothly between the upper rack 82 and lower rack 92, two conditions must exist. First, the adjacent modular units 12, 13 must be in substantial alignment. More specifically, the upper rack 82 of the upper modular unit 12 and the lower rack 92 of the lower modular unit 13 must be in substantial alignment (and, correspondingly, the upper rack assembly 80 and lower rack assembly 90 must be in substantial alignment). Second, as shown in FIG. 6, the distance "D" (measured the same way as "P", i.e., centerline-to-centerline) between the lowermost gear tooth 102 of the upper rack 82 and the uppermost gear tooth 112 of the lower rack 92 must be equal to a multiple of the predetermined pitch "P", in other words, P, 2P, etc. Most preferably, and for the smoothest translation, D is equal to P. As shown in FIG. 6, there is preferably a space "S" between the upper rack 82 and the lower rack 92 so that the upper rack 82 and lower rack 92 do not abrade one another due to vibrations present during normal operation of the cartridge handling assembly 50 (FIGS. 1 and 2). For example, while the racks 82, 92 may each have a pitch "P" of approximately 6 mm, the spacing "S" may be approximately 0.5 mm.

The second cartridge handling assembly 51 may comprise a pinion gear assembly 60 identical to that described above in association with the first cartridge handling assembly 50.

As described above, any number of modular units 12, 13, 14 may be stacked vertically upon one another to form adjacent modular units of a modular data storage system 10, FIG. 1. The rack assemblies (e.g. 80, 90) may be aligned using an alignment tool (not shown) and shifting either the lower adjacent modular unit 13 or the upper adjacent modular unit 12 until the rack assemblies are aligned. Then, the lower modular unit 13 may be fixedly attached to the upper modular unit 12 using any conventional attachment means such as screws or the like. The distance "D" and spacing "D" are maintained between the upper and lower racks 82, 92 (and upper and lower rack assemblies 80, 90) because of the position of the racks 82, 92 within each modular unit housing 30, 32.

Figure 7:
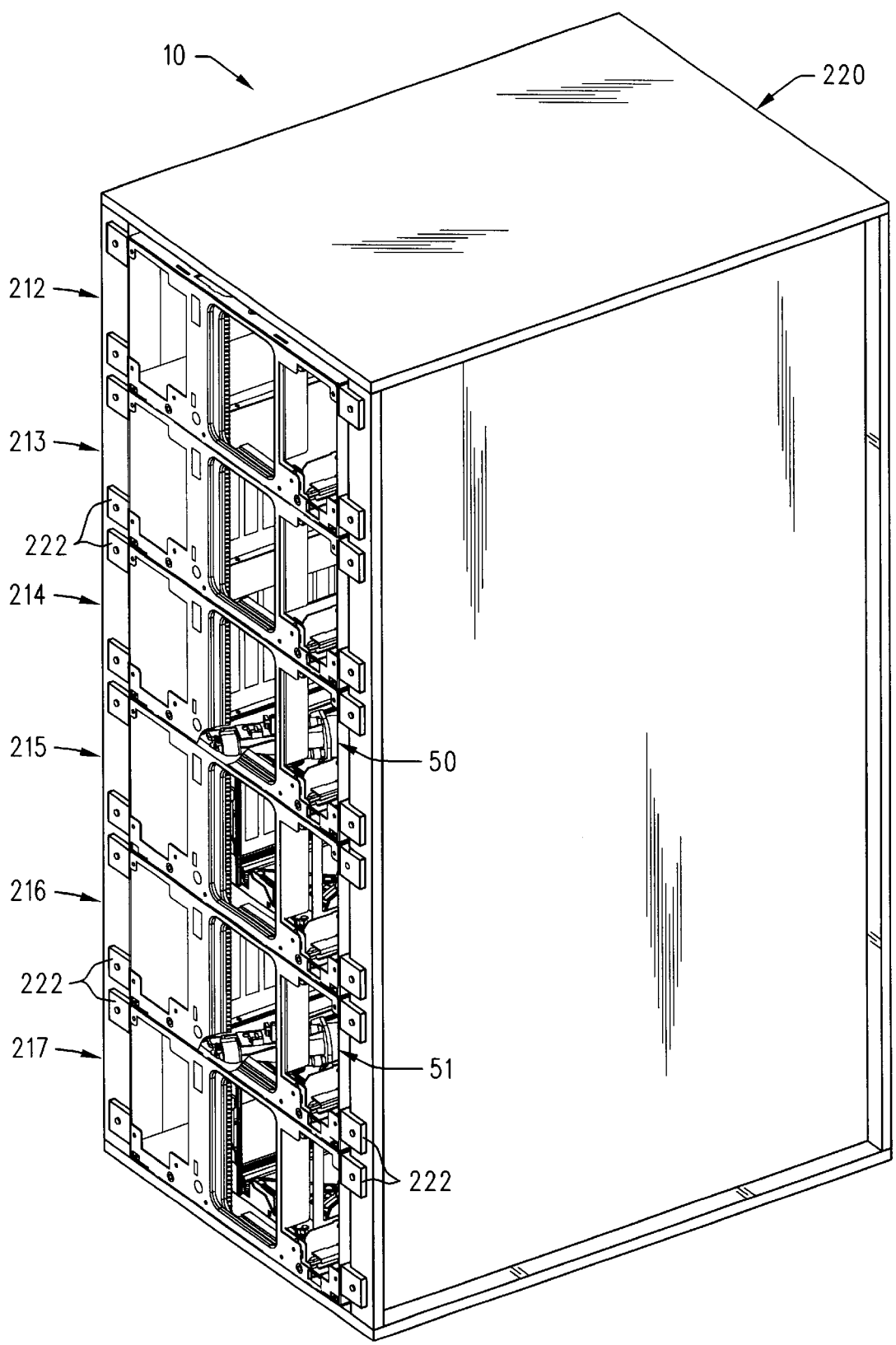
FIG. 7 is an isometric view of modular units from the modular data storage system of FIG. 1 mounted within a rack mount type housing.

In an alternative embodiment shown in FIG. 7, the modular units 212–217 of the modular data storage system 210 are placed within a conventional rack mount housing 220. The housing 220 may comprise a plurality of attaching devices 222, such as the L-shaped brackets shown in FIG. 7, which are adapted to fixedly attach the modular units 212–217 to the housing 220. The attaching devices 222 may be fixedly attached to the rack mount housing 220 using a screw or the like. Each of the modular units 212–217 may be inserted into the rack housing 220 and then fixedly attached to several of the attaching devices 222 screws or the like. It is to be understood that, while L-shaped brackets are shown in FIG. 7, any conventional attaching device may be used to attach the modular units to the rack mount housing, as long as the attaching device does not interfere with the vertical translation of the cartridge handling assemblies 50, 51 among the adjacent modular units, The modular units 212–217 may alternatively be directly attached to the rack housing 220. The size of the rack mount housing 220 (and number of attaching devices 222 the housing 220 can accommodate) may be determined in accordance with a customer's requirements. The modular units may have front covers or bezels mounted over the front faces thereof such as described in U.S. patent application Ser. No. 09/295,491 filed Apr. 20, 1999 for BEZEL ASSEMBLY AND METHOD OF PRODUCTION of Wayne E. Foslien, Joseph M. White, and Seiya Ohto, now U.S. Pat. No. 6,183,053, issued Feb. 6, 2001, which is hereby specifically incorporated by reference for all that is disclosed therein.

It can be seen from the above description that each of the modular units may have many common components, such as the housing, racks, drives and magazines. In addition, identical redundant cartridge handling assemblies 50, 51 may be used, one at a time in alternative operating modes, to access the drives and magazines of all of the intermediate modular units (e.g. 13, or 213–216), as well as any further intermediate unit that may be subsequently added. This replication of components provides many advantages to the manufacturer as well as low-end, mid-range, and high-end customers, since a single set of components could be used to supply an entire family of data storage systems. FIG. 7 shows operation in the fall back operating mode after picker assembly 51 has failed and has descended due to the force of gravity into housing unit 217. Picker 50 is shown operating to move cartridge receiving devices mounted in intermediate housing units 213–216.

Having thus described two specific data storage system embodiments 10 and 210, operation of each will now be explained with reference to a data storage system 300 shown schematically in FIGS. 8–10.

Figure 8:
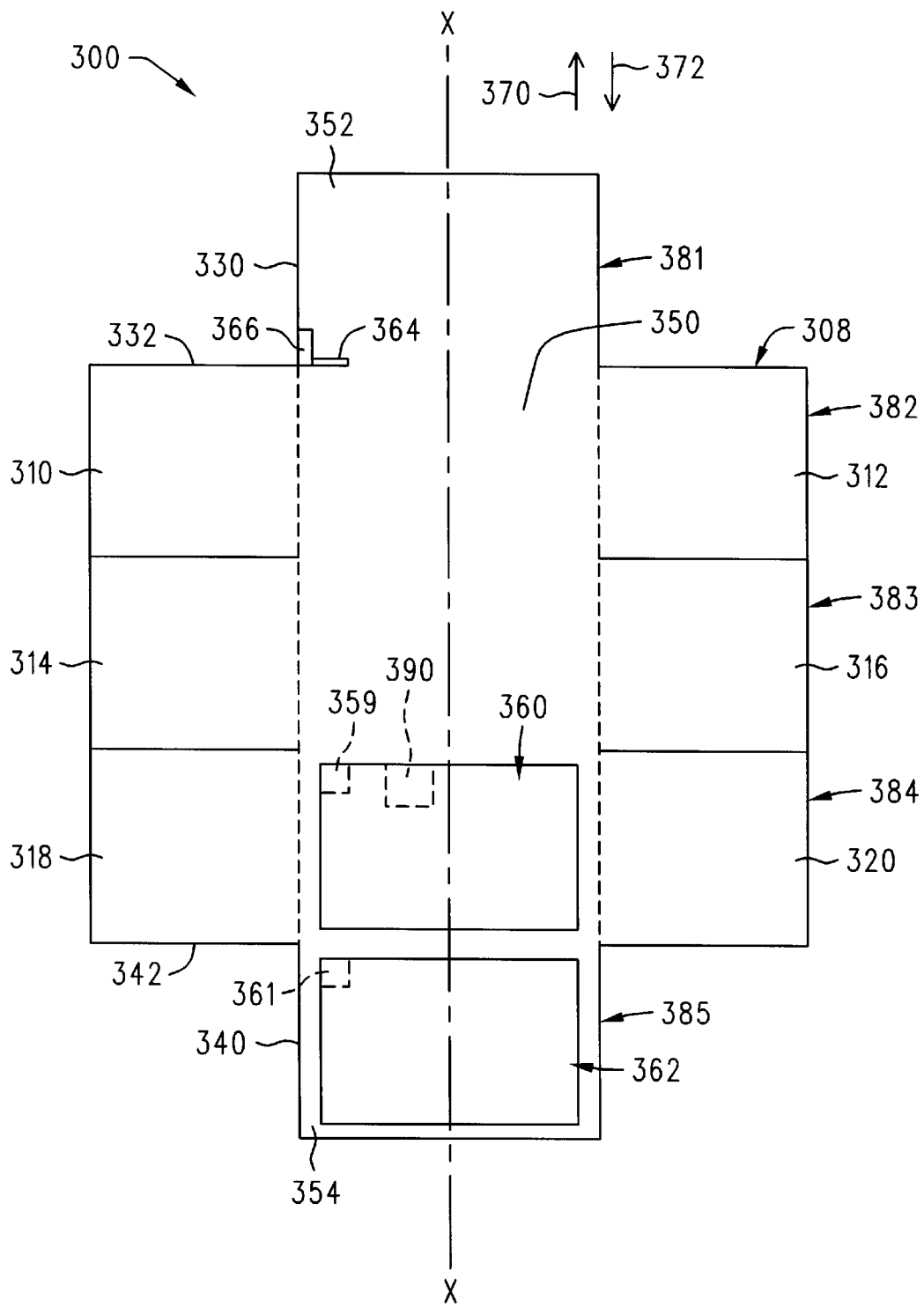
FIG. 8 is a schematic cross sectional elevation view of a data storage system in a shipping/pre-startup mode.

As best shown by FIG. 8, the data storage system 300 comprises a cartridge receiving portion 308 having a plurality of cartridge receiving devices 310, 312, 314, 316, 318, 320 therein. A first picker storage bay 330 is mounted at a first end 332 of the cartridge receiving portion 308. A second picker storage bay 340 is mounted at a second end 342 of the cartridge receiving portion 308. An unobstructed picker displacement path 350, which may be a vertical shaft having a central longitudinal axis XX extends through the cartridge receiving portion 308 and has opposite first and second terminal ends 352, 354 defined by the first and second picker receiving bays 330, 340.

First and second cartridge handling assemblies or pickers 360, 362 are displaceably mounted in the picker displacement path 350. The cartridge receiving devices 310, 312, 314, etc. are arranged in vertically stacked layers defining tiers within the cartridge receiving portion 308 of the data storage system 300. The picker bays 330, 340 also define top and bottom tiers of the data storage system which comprises first, second, third, fourth and fifth tiers 381, 382, 383, 384, 385. The tiers may each be associated with a separate housing module such as shown in FIGS. 1 and 7 or, alternatively, may all be provided in a single non-modular housing.

In a pre-start up operating mode a second picker 362 with feedback unit 361 is positioned in the second picker storage bay 340 and a first picker 360 with feedback unit 359 is positioned in the fourth tier 384, resting on top of the second picker, FIG. 8. This will typically be the position of the pickers when the data storage system 300 is in storage or when it is shipped to a customer. Each picker 360, 362 is operably connected such as by Z-fold ribbon cable, to a central control unit 400, FIG. 11, which receives a position feedback signal therefrom such as by an associated motor encoder 359, 361 or the like. Control unit 400 sends control signals to assemblies 360, 362 to actuate each associated drive unit to vertically displace each handling assembly to a desired position.

Figure 9:
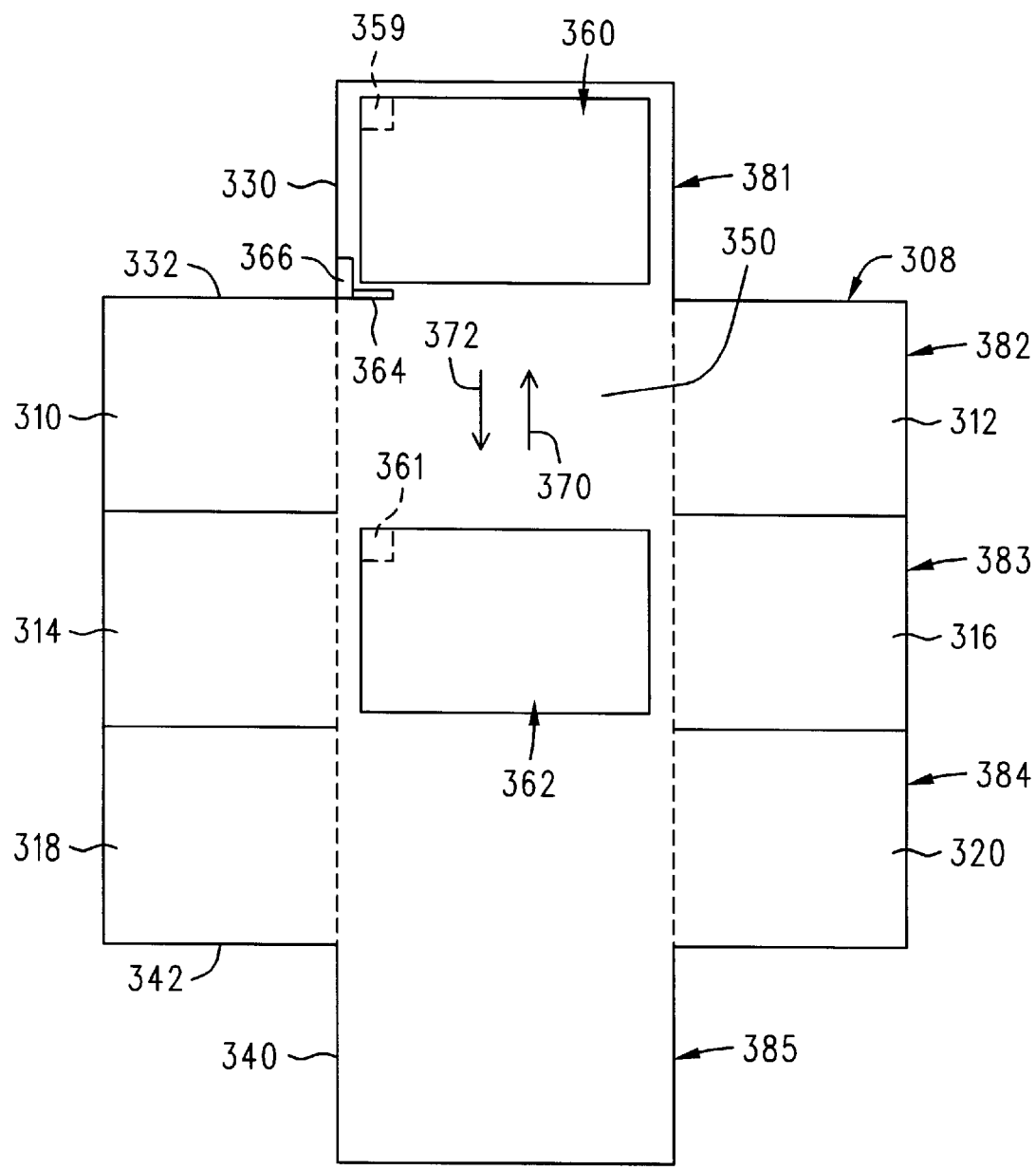
FIG. 9 is a schematic cross sectional elevation view of a data storage system in a normal operating mode.

At system start up the first picker 360 is driven by an associated drive assembly, such as described above with reference to FIG. 2, to a location inside the first picker storage bay 330 as shown in FIG. 9. It then remains in this position during normal operation of the data storage system 300. In one implementation the first picker 360 remains in a power-on state at all times after system start up and is maintained at the position shown in FIG. 9 by force applied by its associated vertical lift drive assembly. In another implementation a gate or lock device 364 is mounted at a lower portion of the first picker storage bay 330 and allows the first picker to pass it without resistance on the way up 370 but prevents the picker from moving down 372 once it has entered the bay 330. (However the gate 364 may be selectively tripped by a gate release device 366 to enable the picker 360 to leave the bay 330 to commence a fall back operating mode as described below.) After system startup the second picker assembly 362 has access to all of the cartridges (not shown) received in the cartridge receiving devices 312, 314, 316, etc in tiers 382–384 and may selectively move cartridges between the various receiving devices.

Figure 10:
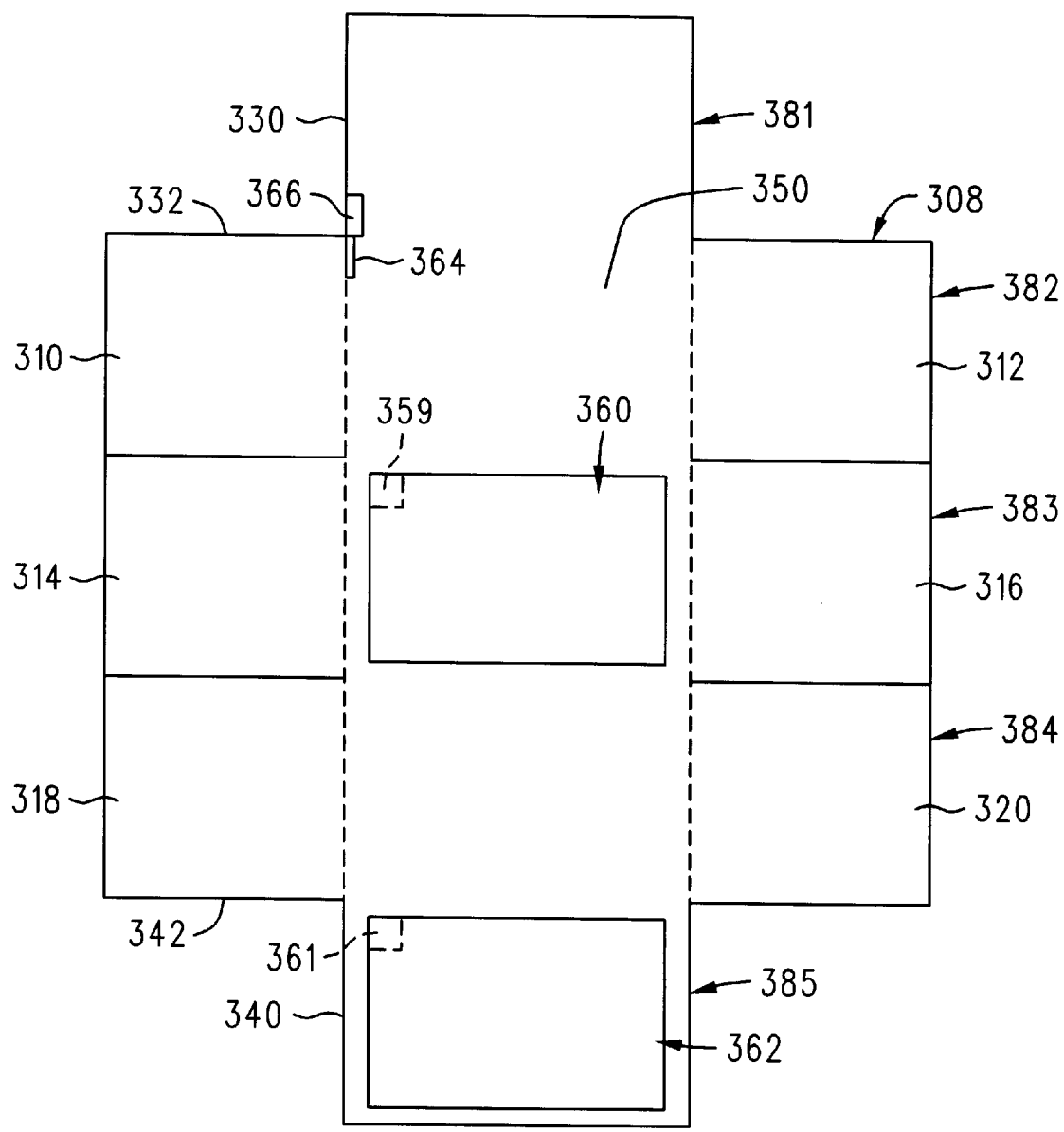
FIG. 10 is schematic cross sectional elevation view of a data storage system in a fall back operating mode.

If the second picker 362 malfunctions and loses power it will descend, due to gravity, into the second picker storage bay 340, as shown in FIG. 10. A sensing assembly 361 within the system, such as a drive motor encoder or current sensor senses the loss of power to the second picker 362 and in response thereto actuates the first picker 360 for required cartridge handling operations of the system. In the implementation in which a gate 364 is used to hold the first picker in its storage bay during normal mode operation, the gate tripper 366 is actuated after power loss to the second picker is sensed. The tripper thus releases gate 364 allowing the now powered first picker 360 to leave storage bay 330 and commence operation in the fall back mode. In the implementation wherein the first picker 360 is constantly powered no such gate or gate release mechanism needs to be actuated.

The second storage bay 340 is preferably constructed and arranged so that the second picker assembly 362 may be readily removed therefrom while the system 300 is operating in the fall back mode. The second picker assembly 362 may thus be replaced by another picker assembly or may be removed, repaired and reinstalled so that the system 300 may be returned to the above described normal mode of operation with a redundant picker.

Although an implementation of system 300 has been described above in which shaft 350 is vertical, it is to be understood that system 300 could also be implemented in a configuration identical to that described above in which shaft 350 is inclined or positioned horizontally. In such configurations gravity may not act on picker 362, or may be insufficient to move it into bay 340 when it loses power. However, the first picker 360 can be used, in an initial operation in the fall back operating mode, as a pusher device to push picker 362 into bay 340. Alternatively picker 362 could be provided with a small rechargeable battery operated backup drive motor 390, or other drive device, which is actuated upon failure of the main drive assembly to drive the second picker assembly 362 into the second picker storage bay 340.

It is also to be understood that the cartridge receiving portion 308 of the data storage system 300, either including or excluding the picker storage bays 330, 340 may be implemented as a series of attached modular units, such as described with reference to FIGS. 1–7, or as a single housing unit which is not separable into different modules.

While illustrative and presently preferred embodiments of the invention have been described in detail herein, it is to be understood that the inventive concepts may be otherwise variously embodied and employed and that the appended claims are intended to be construed to include such variations except insofar as limited by the prior art.

We claim:

1. A data storage system comprising:
    a) a media picker displacement path having a first end and a second end;
    b) a first media picker assembly mounted in said picker displacement path;
    c) a second media picker assembly mounted in said picker displacement path;
    d) a plurality of data storage media access locations located along said picker displacement path;
    e) said first media picker assembly being displaceable along said path from said first end to a point of interfering contact with said second media picker assembly and being selectively positionable adjacent each of said plurality of data storage media access locations when said second picker assembly is positioned at said second end of said path;
    f) said second media picker assembly being displaceable along said path from said second end to a point of interfering contact with said first media picker assembly and being selectively positionable adjacent each of said plurality of data storage media access locations when said first picker assembly is positioned at said first end of said path;

g) said storage system having a normal running operating mode wherein said first media picker assembly is stationarily positioned at said first end of said displacement path and said second media picker assembly is selectively positionable along the remainder of said path;

h) said storage system having a fall back running operating mode wherein said second media picker assembly is stationarily positioned at said second end of said displacement path and said first media picker assembly is selectively positionable along the remainder of said path;

i) said storage system having a transition mode of operation occurring between said normal running mode and said fall back mode wherein said second media picker assembly moves from an intermediate position in said path to said second end of said path;

j) wherein said second media picker assembly is displaced to said second end of said path during said transition mode by gravity.

2. A data storage system comprising:

a) a media picker displacement path having a first end and a second end;

b) a first media picker assembly mounted in said picker displacement path;

c) a second media picker assembly mounted in said picker displacement path;

d) a plurality of data storage media access locations located along said picker displacement path;

e) said first media picker assembly being displaceable along said path from said first end to a point of interfering contact with said second media picker assembly and being selectively positionable adjacent each of said plurality of data storage media access locations when said second picker assembly is positioned at said second end of said path;

f) said second media picker assembly being displaceable along said path from said second end to a point of interfering contact with said first media picker assembly and being selectively positionable adjacent each of said plurality of data storage media access locations when said first picker assembly is positioned at said first end of said path;

g) said storage system having a normal running operating mode wherein said first media picker assembly is stationarily positioned at said first end of said displacement path and said second media picker assembly is selectively positionable along the remainder of said path;

h) said storage system having a fall back running operating mode wherein said second media picker assembly is stationarily positioned at said second end of said displacement path and said first media picker assembly is selectively positionable along the remainder of said path;

i) said storage system having a transition mode of operation occurring between said normal running mode and said fall back mode wherein said second media picker assembly moves from an intermediate position in said path to said second end of said path;

j) wherein said second media picker assembly is displaced to said second end of said path during said transition mode by said first media picker assembly.

3. A data storage system comprising:

a) a media picker displacement path having a first end and a second end;

b) a first media picker assembly mounted in said picker displacement path;

c) a second media picker assembly mounted in said picker displacement path;

d) a plurality of data storage media access locations located along said picker displacement path;

e) said first media picker assembly being displaceable along said path from said first end to a point of interfering contact with said second media picker assembly and being selectively positionable adjacent each of said plurality of data storage media access locations when said second media picker assembly is positioned at said second end of said path;

f) said second media picker assembly being displaceable along said path from said second end to a point of interfering contact with said first media picker assembly and being selectively positionable adjacent each of said plurality of data storage media access locations when said first media picker assembly is positioned at said first end of said path;

g) said storage system having a normal running operating mode wherein said first media picker assembly is stationarily positioned at said first end of said displacement path and said second media picker assembly is selectively positionable along the remainder of said path;

h) said storage system having a fall back running operating mode wherein said second media picker assembly is stationarily positioned at said second end of said displacement path and said first picker media assembly is selectively positionable along the remainder of said path;

i) said storage system having a transition mode of operation occurring between said normal running mode and said fall back mode wherein said second media picker assembly moves from an intermediate position in said path to said second end of said path;

j) wherein said second media picker assembly is displaced to said second end of said path during said transition mode by an auxiliary drive unit mounted on said second media picker assembly.

* * * * *